April 23, 1957 H. J. KLOTZ 2,789,819

TICKET FEEDING DEVICE

Filed Aug. 27, 1953 9 Sheets-Sheet 1

INVENTOR.
HERMAN J. KLOTZ

BY G. R. Gegger
AGENT

TICKET FEEDING DEVICE

Filed Aug. 27, 1953 9 Sheets-Sheet 2

INVENTOR.
HERMAN J. KLOTZ

BY G. R. Gugger
AGENT

April 23, 1957 H. J. KLOTZ 2,789,819

TICKET FEEDING DEVICE

Filed Aug. 27, 1953 9 Sheets-Sheet 3

*INVENTOR.*
HERMAN J. KLOTZ

*BY*

G. R. Gugger

AGENT

INVENTOR.
HERMAN J. KLOTZ
BY
G. R. Gugger
AGENT

INVENTOR.
HERMAN J. KLOTZ

BY

G. R. Gugger

AGENT

INVENTOR.
HERMAN J. KLOTZ

BY

G. R. Gugger
AGENT

April 23, 1957 H. J. KLOTZ 2,789,819

TICKET FEEDING DEVICE

Filed Aug. 27, 1953 9 Sheets-Sheet 7

INVENTOR.
HERMAN J. KLOTZ

BY G. L. Gugger
AGENT

April 23, 1957 H. J. KLOTZ 2,789,819

TICKET FEEDING DEVICE

Filed Aug. 27, 1953 9 Sheets-Sheet 8

INVENTOR.
HERMAN J. KLOTZ

BY G. R. Gugger
AGENT

| NUMBER | CHECK | 7 | 4 | 2 | 1 |
|---|---|---|---|---|---|
| BLANK | | × | × | | |
| 0 | | × | × | | |
| 1 | × | | | | × |
| 2 | × | | | × | |
| 3 | | | | × | × |
| 4 | × | | × | | |
| 5 | | | × | | × |
| 6 | | | × | × | |
| 7 | × | × | | | |
| 8 | | × | | | × |
| 9 | | × | | × | |

*INVENTOR.*
HERMAN J. KLOTZ

*BY*

G. R. Gugger
AGENT

1

2,789,819

TICKET FEEDING DEVICE

Herman J. Klotz, Endicott, N. Y., assignor to International Business Machines Corporation, New York, N. Y., a corporation of New York Application August 27, 1953, Serial No. 376,929

7 Claims. (Cl. 271—10)

This invention relates generally to record making devices and more specifically to a punched card reproducer operated under control of a punched document.

The invention is illustrated in connection with merchandise control work in which a relatively small price tag stub is prepunched with basic merchandise information and forms the original document which is sensed to control the perforation of standard IBM type accounting machine cards.

The price tag illustrated herein is a well-known type which consists of a basic ticket designed for string or pin attachment to the mechandise, and one or more printed and punched stubs; each of these units bearing identifying data, including such items as manufacturer, size, style, price, color, etc. It is the main object of the present invention to provide a device which will accept the tag stubs and convert them into the standard control records.

Another object of the present invention is the provision of a novel feed mechanism for feeding the ticket stubs to the reproducing machine. It can be well understood that while the price tags are attached to the merchandise they are subjected to a great deal of wear and handling by prospective customers and it can be appreciated that in many cases, by the time a sale is made and the clerk detaches the ticket stubs from the tag, the stubs are pretty well worn and oftentimes even torn or mutilated in some fashion, particularly along the sides or edges.

The feeding of such stubs presented a serious problem in view of the accuracy required to properly present the stubs to the sensing mechanism. It was found that if the stubs could be fed by means of registration holes within the stub itself rather than from the sides or edges of the stubs that the required accuracy of feed could be maintained. Therefore there is provided a novel arrangement for stacking said stubs in a feed hopper with means for offsetting the bottommost stub so that the registration holes therein may be properly positioned for feeding of the stub to the reproducer sensing mechanism.

In keeping with the above-described object it is a further object of the invention to provide a novel pin feeding mechanism for engaging the registration holes in each stub as the stub is offset from the remainder of the stack and to successively feed the stubs to the sensing mechanism.

Other objects of the invention will be pointed out in the following description and claims and illustrated in the accompanying drawings, which disclose, by way of example, the principle of the invention and the best mode, which has been contemplated, of applying that principle.

2

Figure 4:
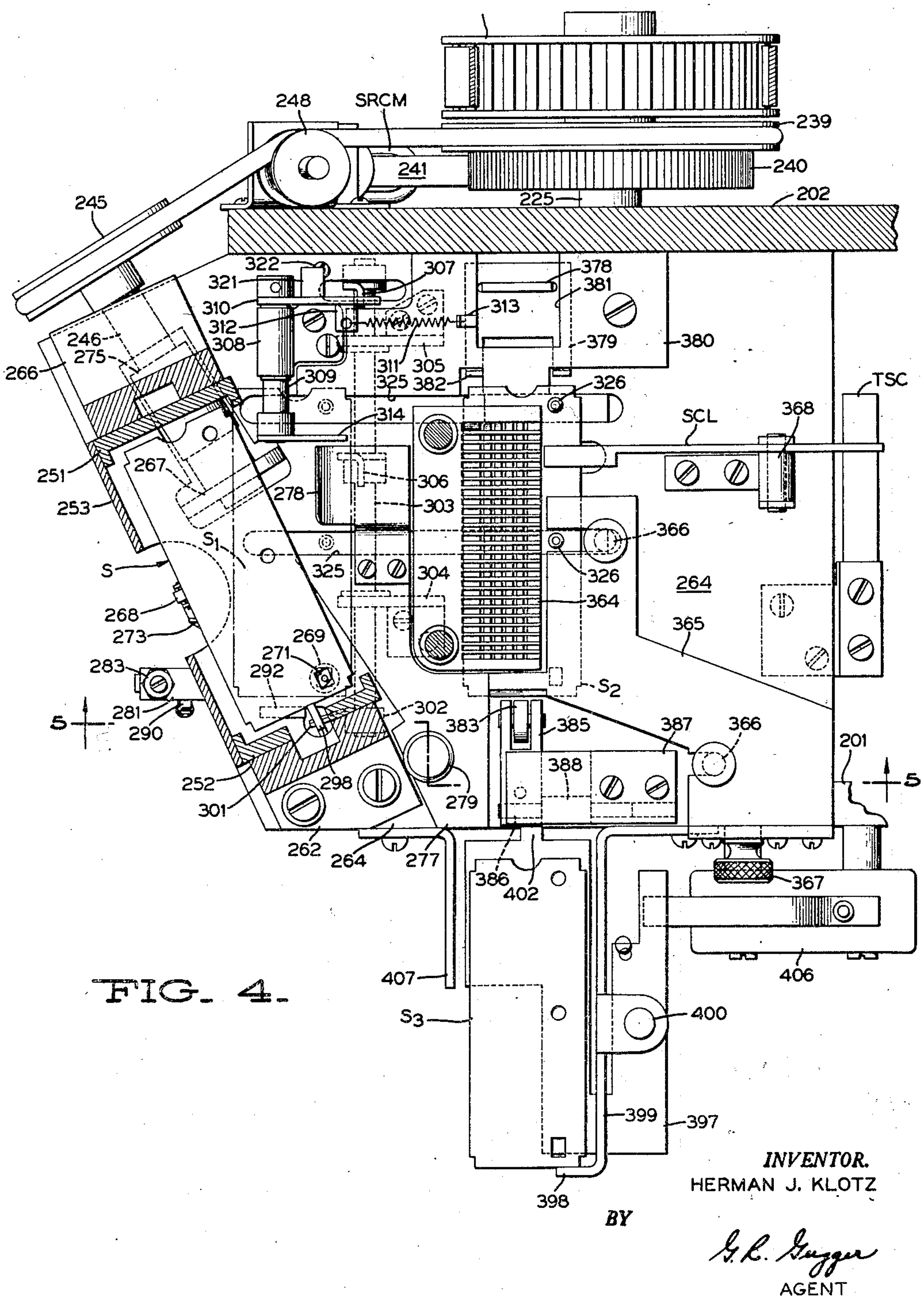

Fig. 4 is a plan view in partial section with the sensing device removed.

Figure 5:
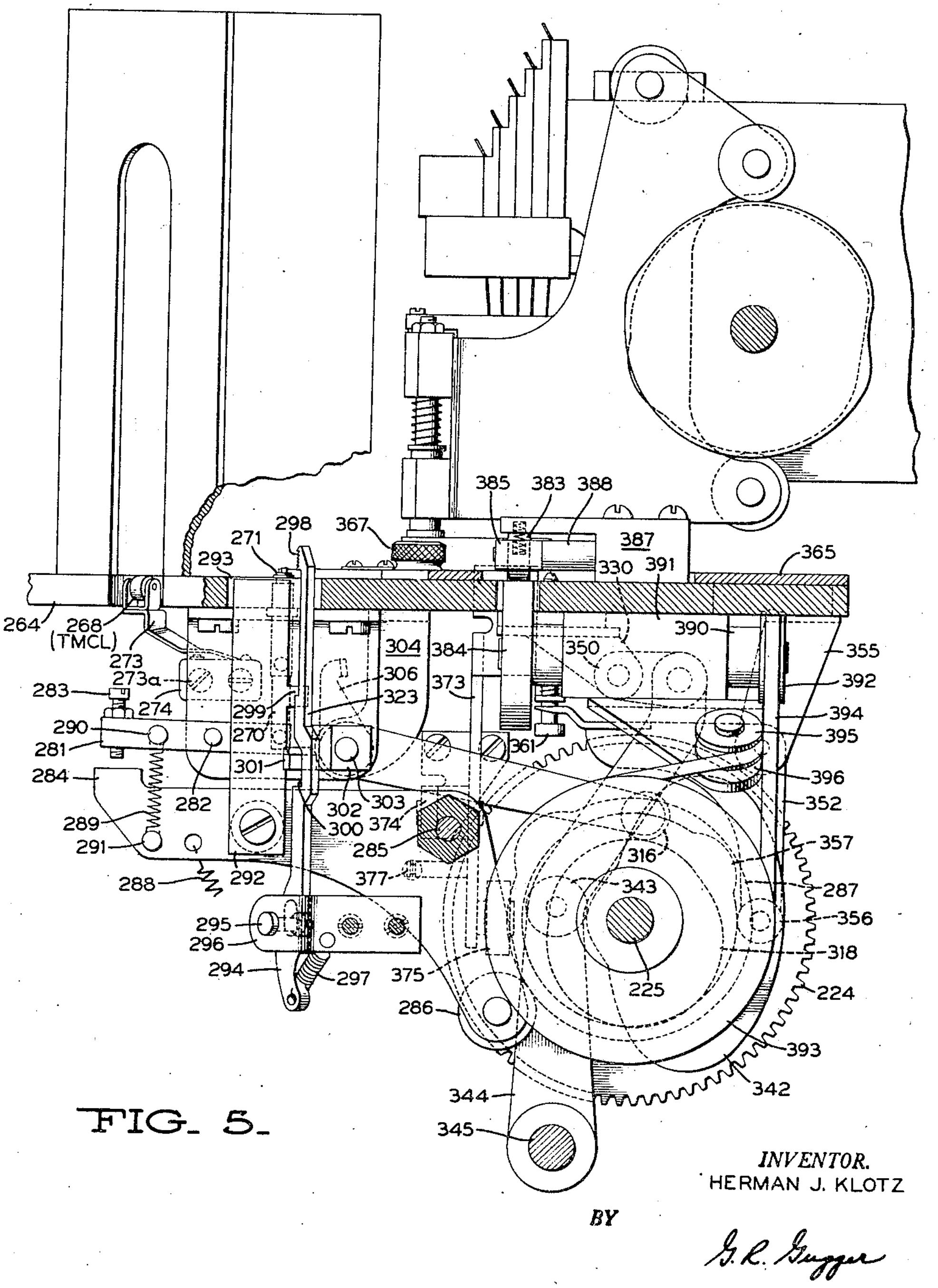

Fig. 5 is a sectional view taken on line 5—5 of Fig. 4 showing various cam drive connections.

Figure 6:
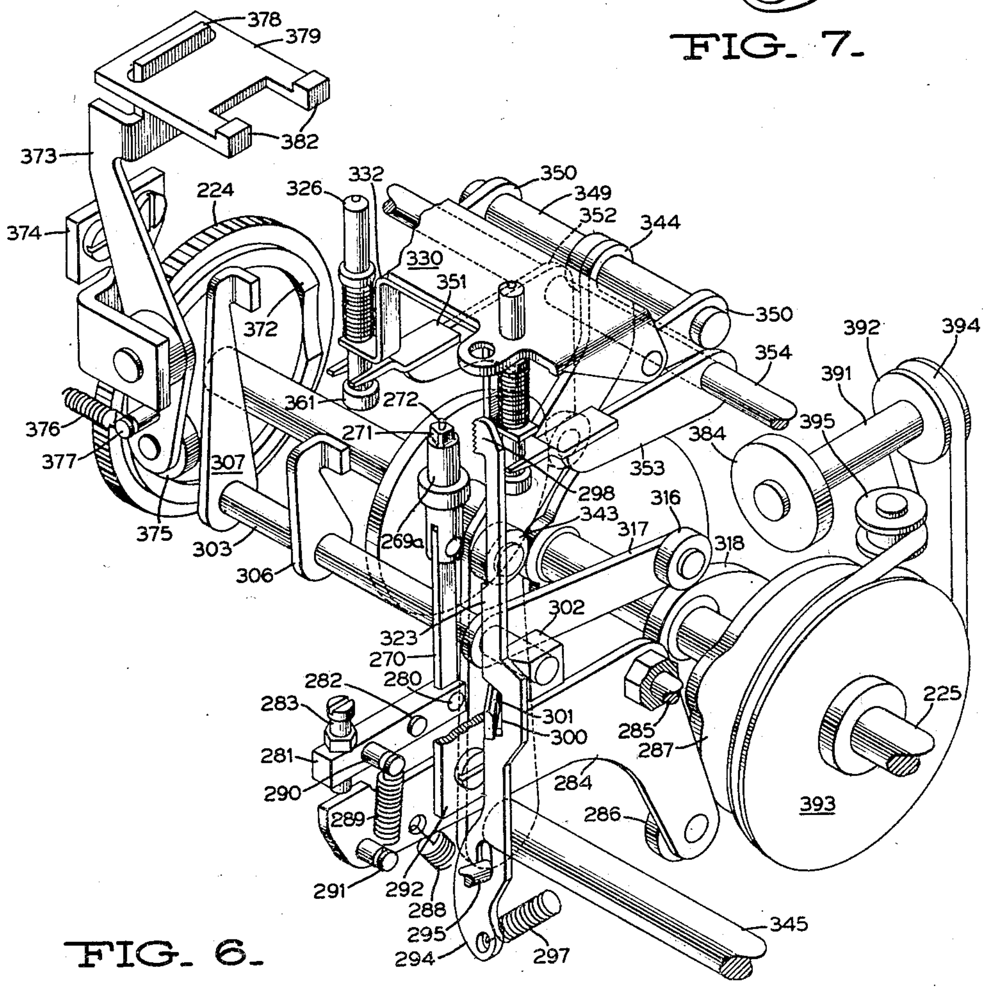

Fig. 6 is a perspective view showing the components of the skid roll drive mechanism and the eject mechanism along with a partial showing of the sliding block pin feed mechanism.

Figure 7:
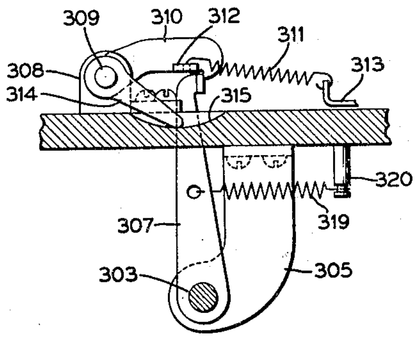

Fig. 7 is a detail view of the card lever mechanism for controlling operation of the pin feed device.

Figure 8:
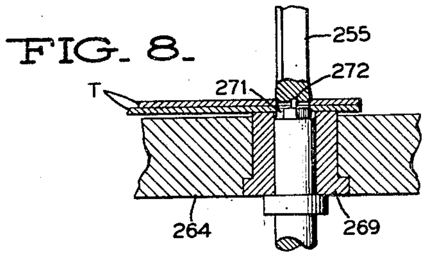

Fig. 8 is a detail view showing the relationship between the bottom two tickets in the ticket magazine prior to feeding.

Figures 9, 10, 11:
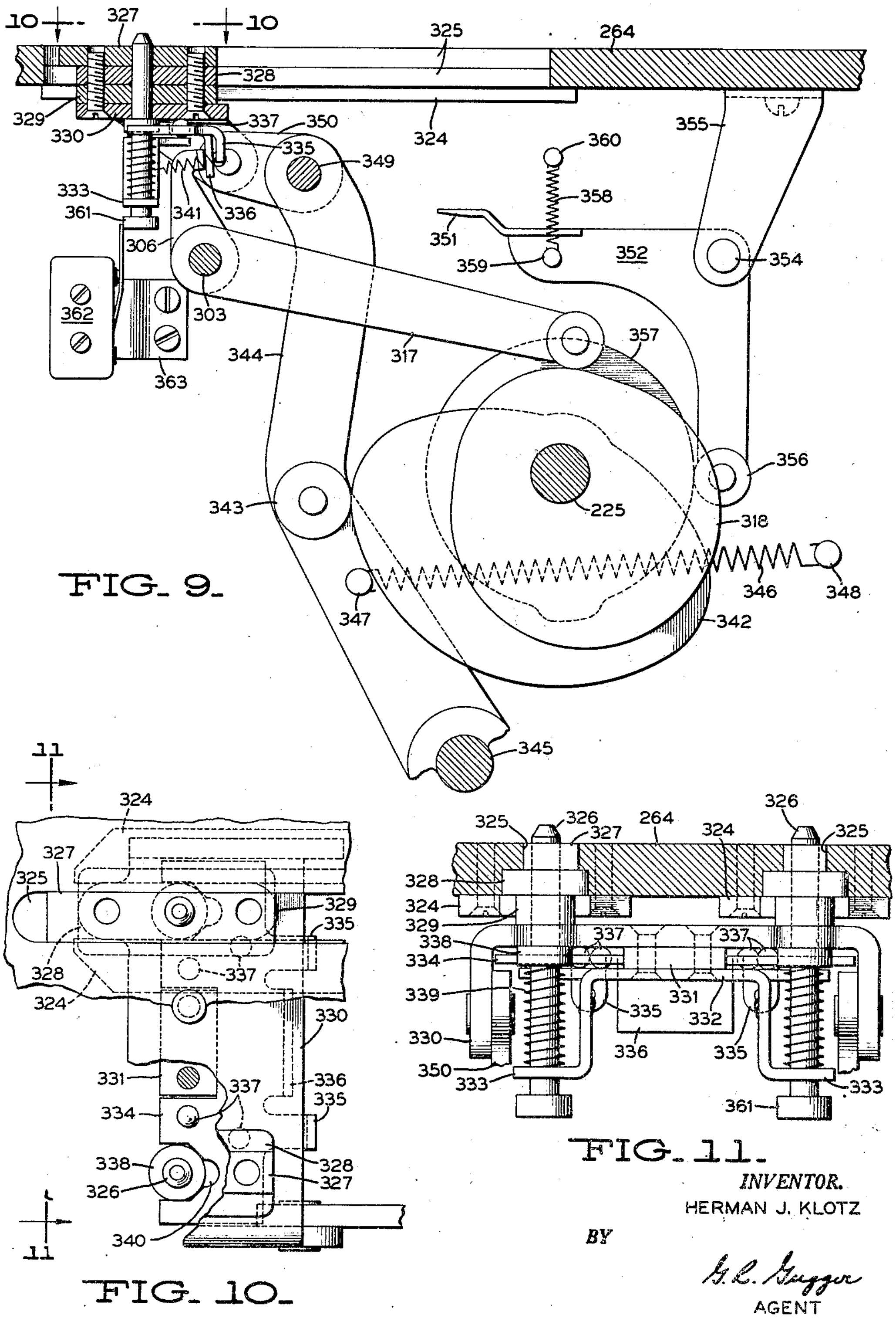

Fig. 9 is a fragmentary view showing a sectional view of the pin feed slide assembly.

Fig. 10 is a plan view part in section taken on line 10—10 of Fig. 9.

Fig. 11 is a front elevation view of the pin feed slide assembly taken on line 11—11 of Fig. 10.

Figure 12:
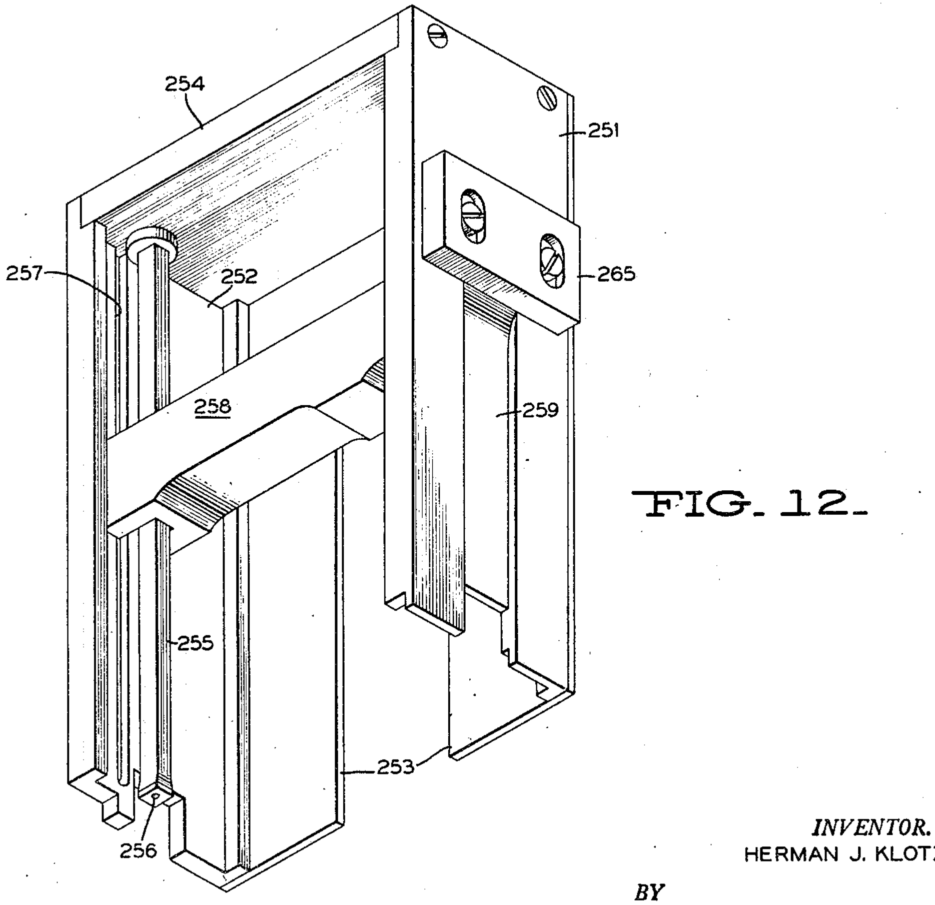

Fig. 12 is a perspective view of the ticket feed magazine.

Figures 13, 14:
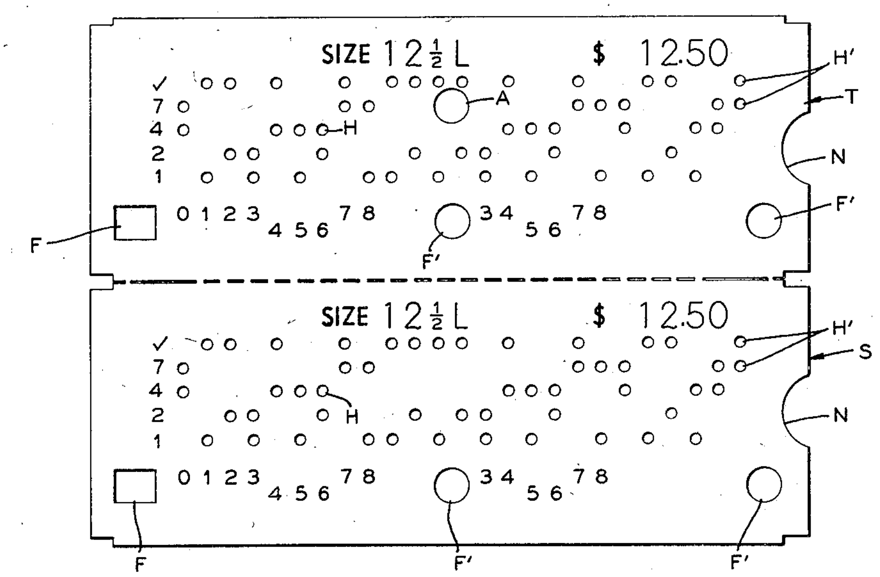

Fig. 13 is a chart showing the code used for the information punched in the tickets.

Fig. 14 is a view of a perforated and preprinted ticket and ticket stub.

*Price tag*

Referring to Fig. 14, there may be seen a typical merchandise tag consisting of a ticket portion T and a stub portion S. Both the ticket and the stub are proportioned with a plurality of punched information index point positions there being 24 vertical columns of 5 punching positions each along with a 25th column of 2 punching positions. There are, then, a possible 122 index point positions, such as indicated at H, at which information may be prepunched into the ticket or the stub.

Arranged horizontally across the top of the ticket and the stub is printed information relating to the size and price of the particular article to which the tag will be attached. Columns 10 through 12 are reserved for punchings relating to the size of the article and columns 20 through 24 for punchings relating to the price. The word "size" preceding the size field and the dollar sign and the decimal point shown in the price field would be preprinted on the tag by the tag manufacturer. All of the punchings and remaining printed matter is put on the tag by a tag marking machine prior to attaching the tag to the merchandise. The tag marking machine forms no part of the present invention and hence will not be described.

Across the bottom of the ticket and the stub is a horizontal row of printed coded information relating to such items as manufacturer, color, style, etc. The printing is offset vertically into actually two rows to indicate the different fields of information. The punchings in columns 1 through 9 and 14 through 19 relate to said bottom rows of printed information, this information being printed also by the tag marking machine prior to attaching the tag to the article.

The two punchings indicated as H' in column 25 are control punchings used to control the operation of the punching machine in a manner to be described.

The code used for punching the necessary information into the ticket and the stub is shown in Fig. 13. The code used is a well-known 5 element, consistent 2 out of 5 code having the bit values of 1, 2, 4, 7 and check.

The tag marking machine in addition to putting the above-described information on the tag also prepunches a series of three feed registration holes indicated at F and F' on the ticket and stub shown in Fig. 14. As will be described, the registration hole F serves to position the stub in the feed hopper and to aid in properly feeding the stub out of the hopper. The registration holes F' are used to feed the stub to the sensing mechanism where the punchings H and H' are sensed to control the reproducing machine. In addition to the registration holes there is also prepunched in each ticket a hole indicated at A on Fig. 14. The hole A is used to attach the tag to the article of merchandise by means of a string or the like.

Each stub has a semicircular notch N cut at one end which is used to aid the clerks in stacking the stubs as the merchandise is sold. At each sales station there is a stacker box into which the tag stubs are placed as the sales are made. The stubs are detached from the tag and the ticket portion remains with the article and serves as the customer's record of sale. Each stacker box is provided with a suitable guide bar which intercepts the notch N in the stubs and insures that the stubs will be properly stacked for use in the feed hopper of the ticket stub feeding device. As will be presently understood the ticket stub feeding device and sensing mechanism is attached to the read side of the well-known IBM reproducing punch and during the converting operation actually functions in place of the read unit of the machine.

*Driving connections for ticket stub feed and sensing mechanisms*

Figure 1:
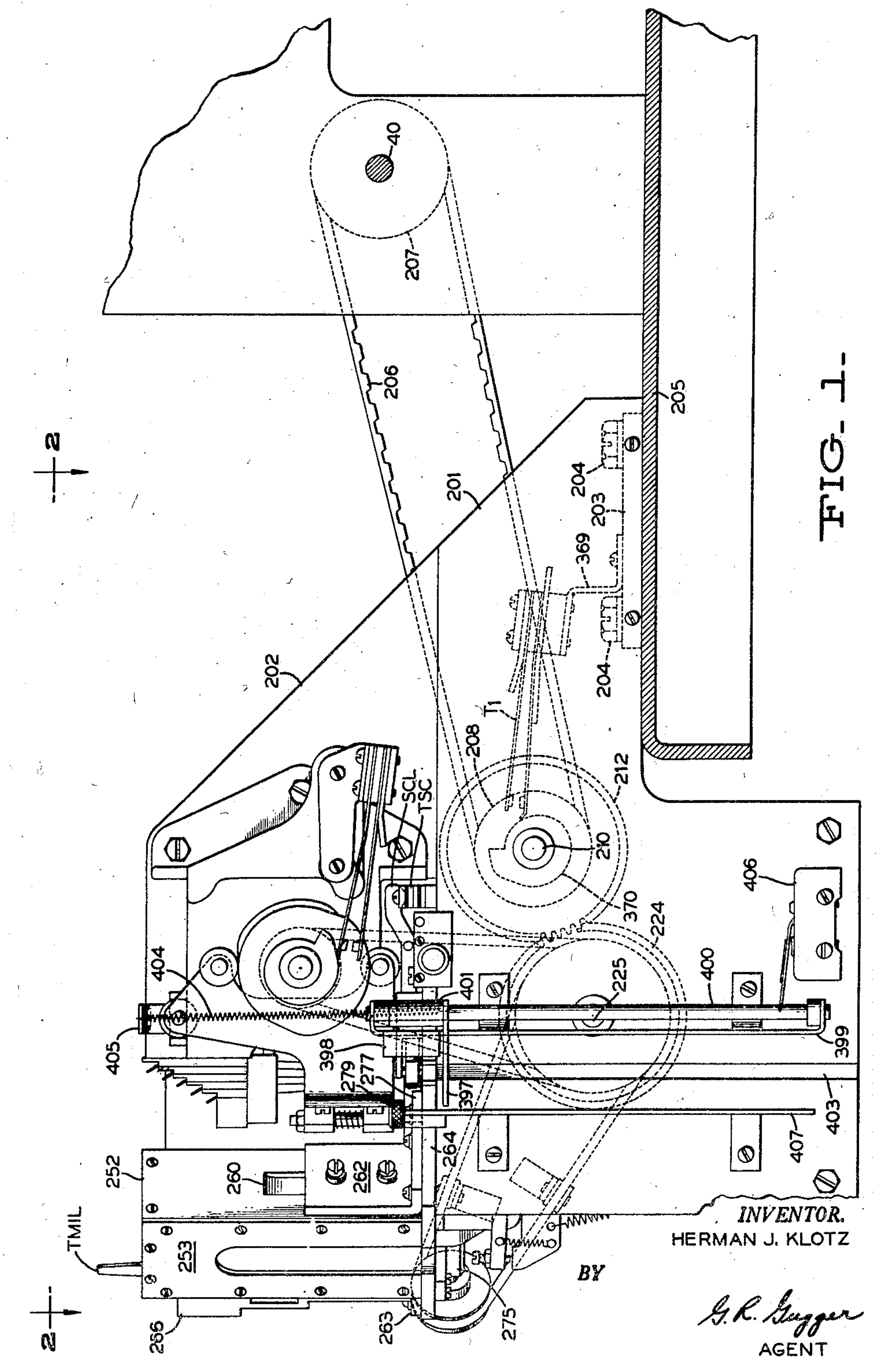
Fig. 1 is a side elevation view of the ticket stub feeding and sensing devices shown attached to the frame of the reproducing machine.

Referring to Fig. 1, the ticket stub feed and sensing mechanisms are shown assembled as a unit between a pair of side frame members 201 and 202. These side frame members are joined together at the bottom by a support plate 203. The support plate in turn is fastened by bolts 204 to an extension 205 of the frame of the reproducing machine, the entire assembly being located adjacent to the read hopper R of the reproducing machine. The reproducing punching machine may be of the type shown in Patent Re. 21,133, issued to C. D. Lake on June 27, 1939, and reference may be had to this patent for a full and comprehensive understanding of its operation.

Figure 2:
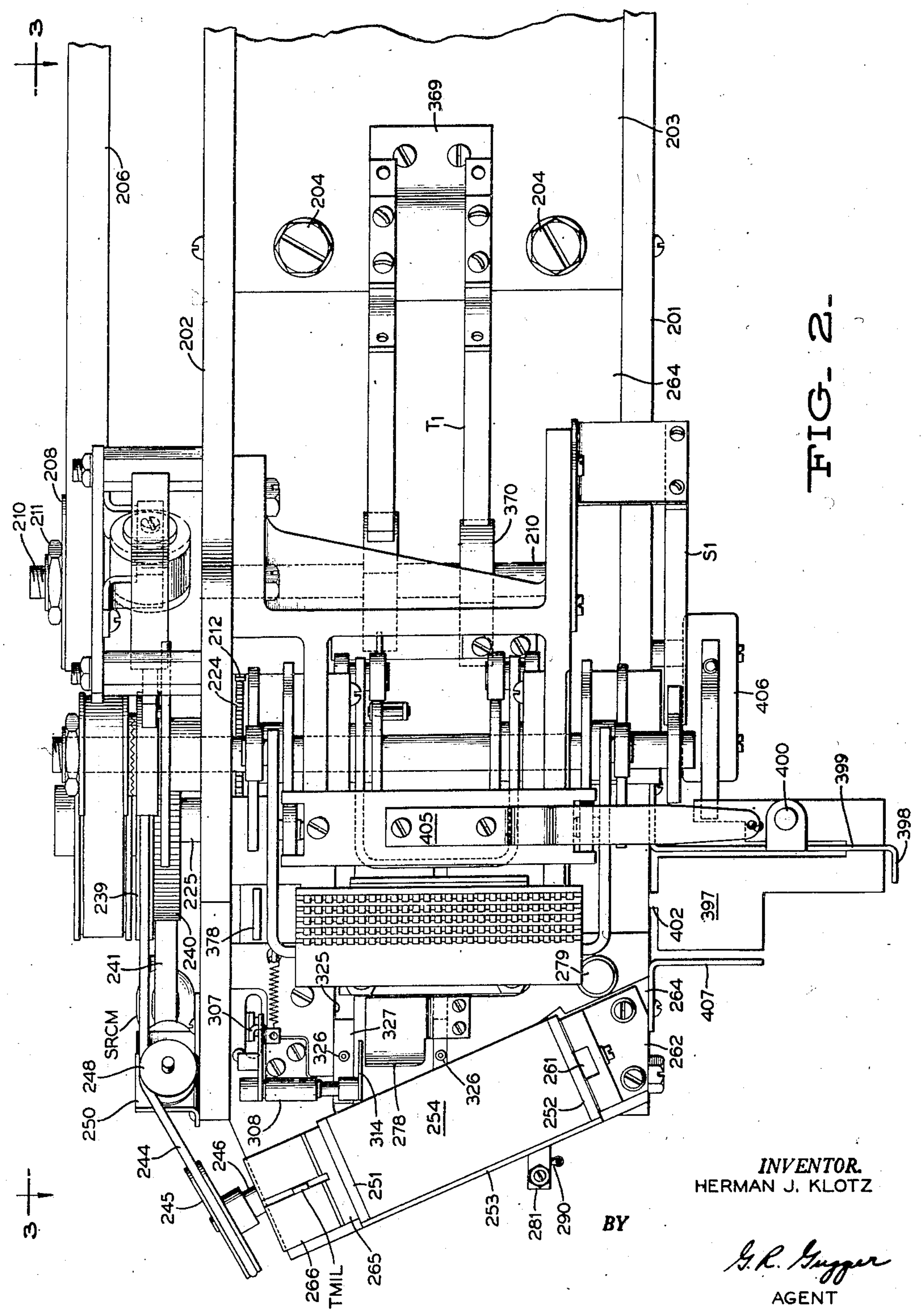
Fig. 2 is a plan view taken on line 2—2 of Fig. 1.

The drive is taken from the continuously running reproducer shaft 40 by means of a timing belt 206 which is connected between a pulley 207 fastened on shaft 40 and a pulley 208 fastened on a bushing 209 which is rotatable on a shaft 210. The shaft 210 is journaled in the frame members 201, 202 and has a lock nut 211 attached at one end as shown in Fig. 2.

Figure 3:
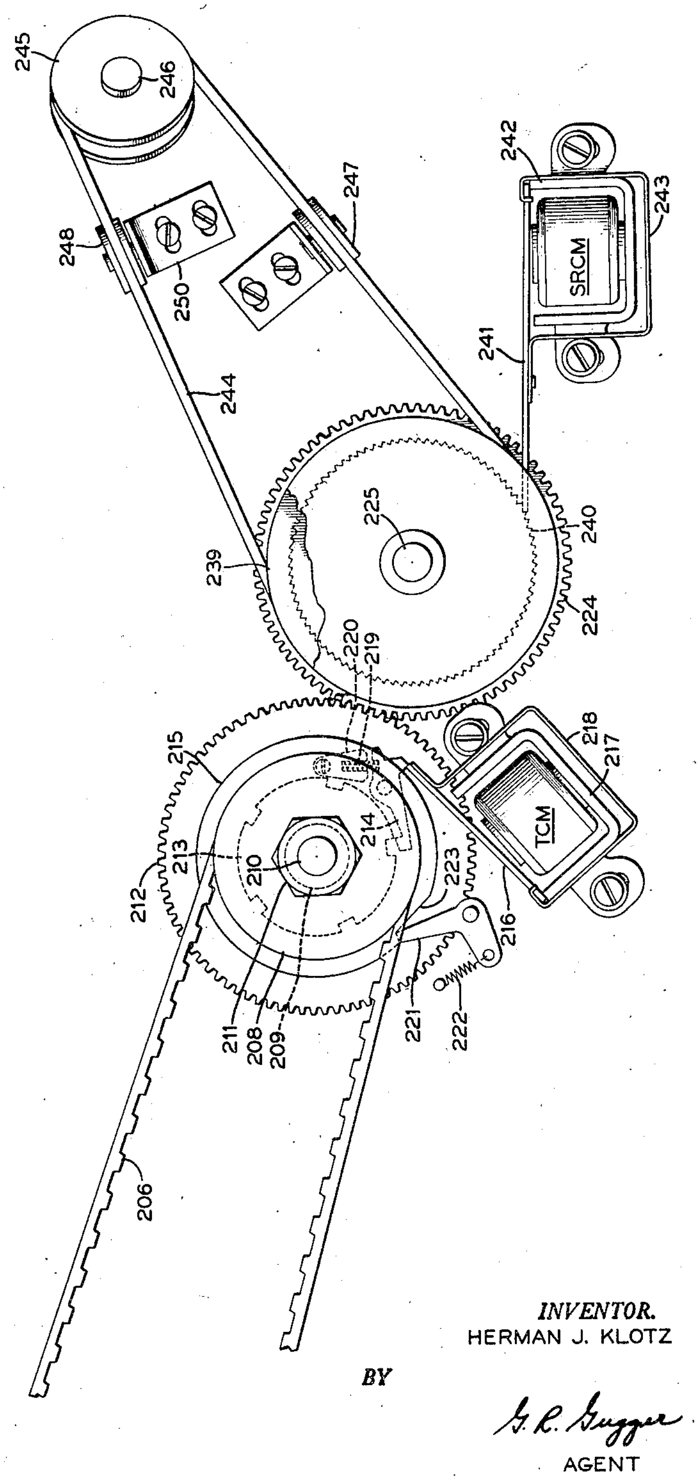
Fig. 3 is a side elevation taken on line 3—3 of Fig. 2 showing the driving connections between the ticket stub feeding devices and the reproducing machine. The side frame of the machine has been removed for clarity.

As shown in Fig. 3, the drive is transmitted from the pulley 208 to a driving gear 212, fastened on shaft 210, by means of a clutch mechanism. This clutch will be referred to hereinafter as the ticket clutch and, as will be seen, it must be operated before the ticket stub feeding and sensing devices can operate. The ticket clutch mechanism comprises a toothed clutch wheel 213 which is fastened to the pulley 208 and revolvable therewith on shaft 210. For cooperation with the toothed wheel there is provided a pawl 214 which is pivoted to a clutch disc 215 fixed on the shaft 210. The pawl 214 is normally held out of engagement with the toothed clutch wheel by a magnet armature 216 which is pivoted on a bracket member 217 fastened to the outside of the frame member 202. The bracket member 217 supports a ticket clutch magnet TCM and also a spring blade member 218 which serves to maintain the armature in its unattracted position where it will engage the pawl 214. The pawl 214 is biased in a clockwise direction by a compression spring 219 which is mounted in a support block 220 fastened to clutch disc 215.

Energization of the clutch magnet will release the pawl 214 for engagement with a tooth in the clutch wheel 213. When this happens the clutch disc 215, shaft 210 and gear 212 will be driven in a clockwise direction. At the end of one revolution the armature 216 will be in its unattracted position and will disengage the pawl from the clutch wheel thereby causing the shaft 210 and gear 212 to stop rotation. A detent lever 221 pivoted to the frame member 202 is biased clockwise by a spring 222 and cooperates with a notched portion 223 on the clutch disc to detent the clutch mechanism.

The gear 212 which is located on the shaft 210 adjacent the inner side of frame member 202 meshes with and drives a gear 224 fixed on a shaft 225. The shaft 225 is one of the main cam shafts and is journaled in the frame members 201 and 202.

Frictionally mounted on the shaft 225 is a pulley 239 and ratchet wheel 240 which is affixed to said pulley. During the normal rotation of shaft 225 the ratchet wheel 240 and pulley 239 are prevented from being rotated by the engagement of a magnet armature 241 with the ratchet wheel. The magnet armature is mounted on a bracket member 242 which supports a skid roll clutch magnet SRCM. Energization of the magnet SRCM disengages the armature 241 and the pulley and ratchet wheel assembly will rotate with shaft 225. When the magnet SRCM is de-energized, a spring blade 243 restores the armature into engagement with the ratchet wheel 240 and stops the assembly from rotating.

The pulley 239, by means of a belt 244, drives a pulley 245 fixed on a skid roll shaft 246. The belt 244 is guided by a pair of guided rollers 247, 248 rotatably mounted on brackets 249, 250 secured to the outside of frame member 202. The skid roll shaft functions to control the feeding of a ticket stub out of the feed hopper as will be described in connection with the ticket stub feed mechanism.

*Ticket stub feed magazine*

The magazine for holding the ticket stubs preparatory to feeding may be seen in Fig. 12 where it is shown in an inverted position, which is the position it assumes when assembled on the ticket stub feeding device.

The magazine comprises a pair of side plates 251, 252, a back plate 253 and a horizontal plate 254, all of which are fastened together to form a magazine or hopper as shown. Rigidly attached to the plate 254 and extending vertically downward is a rectangular rod 255 having a small hole 256 in its free end. The rectangular rod 255 is adapted to extend through the rectangular registration holes F in the ticket stubs when the stubs are placed in the magazine and serves to guide the stubs during the course of feeding. The bottom end of the rod 255 tapers out slightly and snugly supports the next to the bottom ticket, the remainder of the tickets being loosely guided by said rod. Cut on the inside of the two side plates 251, 252 is a groove, such as is indicated at 257, and these two grooves serve as tracks for guide pins (not shown) fastened to each end of a weight 258. The weight 258 is free to slide up and down the rod 255 and as will be later understood aids in initiating a positive feed of the bottom-most ticket stub.

To load the magazine, the magazine is inverted from the position shown in Fig. 12, the weight dropping against the plate 254, and the ticket stubs are threaded on the square rod 255. The magazine is then inverted again and assembled on the ticket feeding device with the tickets in position to be taken off one at a time from the end of the square rod 255.

For mounting the magazine onto the feeding device there is provided on the outside of each of the magazine side plates a slot such as is indicated at 259 in Fig. 12 and at 260 in Fig. 1. These slots enable the magazine to be mounted on a pair of vertical guide rails, such as the one indicated at 261 in Fig. 2, and in between a pair of guide brackets 262, 263 as shown in Fig. 1. Each of said guide rails is attached to one of the guide brackets and the guide brackets are fastened to a base plate 264 of the ticket feeding device.

When the magazine is mounted in place on the feeding device, a block 265 (Fig. 12) attached to the magazine side plate 251 cams a ticket magazine interlock lever TMIL (Figs. 1 and 2) for the purpose of closing a microswitch 266. The microswitch contacts serve to condition the starting operation of the feeding device.

It will be noted that the ticket magazine is mounted at an angle to the expected line of travel of the ticket stubs between the side frames 201 and 202. This arrangement is in keeping with the principles of the invention for, as previously mentioned, one of the main objects of the present invention is to provide means for feeding the stubs from registration holes within the stubs themselves rather than from the sides or edges. As such the stubs in the magazine are pivoted around the bar 255, one at a time, into a position where they may be released and grasped by other feeding means for conveyance between the side frames 201, 202.

*Ticket stub feed mechanisms*

The ticket stub feed mechanisms make up the main substance of the present device and consist of three separate units; namely, a skid roll feeding device for offsetting the bottom ticket in the magazine, a sliding block pin feed device for conveying the tickets to the static sensing device, and an eject mechanism for ejecting the ticket from the sensing device into an eject stacker. Referring to Fig. 4, the path of feed for the ticket S is from the ticket magazine to the position indicated at $S_1$ where it is grasped by the sliding block pin feed device and conveyed to the position indicated at $S_2$ to be sensed by the sensing device. After sensing, the ticket is ejected to the position indicated at $S_3$ in the eject stacker.

*Skid roll feed mechanism*

The skid roll feeding mechanism is best shown in Figs. 4, 5 and 6. With the magazine mounted in place the pack of tags is supported by three components; namely a skid roll 267 (Fig. 4), a card lever roller 268 and a bushing 269 which is mounted in the base plate 264 as shown in Fig. 8.

Slidable within the bushing is a short rod **269*a* which is attached to a vertically arranged link 270 as shown in Fig. 6. Mounted in the top of the rod 269*a* is a diamond-shaped stud 271** which is adapted to enter the square registration hole $F^1$ of the bottom ticket in the magazine. The apices of the stud are positioned with respect to the sides of the registration hole $F^1$ about as shown in Fig. 4 and allow for free rotation of ticket as will be presently described.

On the top of the stud 271 there is fixed a pin 272 which is adapted to enter the hole 256 in the bottom of the square rod 255 when the magazine is inserted in place. The pin 272 assures that the square rod and the diamond-shaped stud are in alignment to allow the bottom ticket to fall accurately in place on the bushing 269. As seen in Fig. 8, clearance between the end of rod 255 and the top of bushing 269 is such that the stud 271 extends upward through the thickness of the bottom ticket while the rod 255 extends downward only partially through the thickness of the next to the bottom ticket. The bottom ticket may then be rotated about the stud 271 while the next to the bottom ticket is held against movement by the rod 255. The top surface of bushing 269 is kept to a minimum size so that warped tickets will lie substantially flat on said surface. Also the top of bushing 269 and skid roll 267 are above the base plate 264 to permit warped tickets to settle on these points without pressing against the base plate.

The card lever roller 268 extends up through a semi-circular opening in the base plate 264 and is mounted on a spring arm 273 which is fastened to the top of a microswitch **273*a* to close same to condition operation of the machine when ticket stubs are placed in the magazine. The microswitch 273*a* in turn is attached to a support bracket 274 (Fig. 5) bolted to the underside of the base plate 264**. The spring arm and roller are referred to in Fig. 5 as the ticket magazine card lever TMCL.

Referring to Fig. 4, the skid roll 267 is fixed on the skid roll shaft 246, the shaft itself being rotatable in a support bearing bracket 275 attached to the underside of the base plate 264. The skid roll projects slightly through an opening 276 in the base plate 264 bearing against the underside of the bottom ticket. Each energization of the skid roll clutch magnet SRCM will, through the gear train previously described, cause the skid roll to revolve and rotate the bottom ticket around stud 271 to the position indicated at $S_1$. The duration of rotation of the skid roll each cycle is short and extends for approximately two and one-half cycle points on the machine index as governed by a pin bail contact to be later described. At the completion of skid roll rotation, the ticket is located in alignment with the pin feed path of travel and partially extends underneath a guide plate 277 and extension guide member 278. The guide member 278 is a thin plate having its leading edge turned up slightly and is bolted to the guide plate 277 which in turn is removably mounted on top of the base plate 264 by means of a thumb screw 279.

After the ticket is located at position $S_1$, certain mechanisms are operated for lowering the diamond stud 271 clear of the registration hole F in the ticket and at the same time raising the remaining pack of tickets in the magazine preparatory to the operation of the pin feeding device. These mechanisms may best be seen by referring to Fig. 6.

The link 270 for the diamond stud is shown pivoted at 280 in a slot in one end of a bar 281. The bar 281 is in turn pivoted at 282 to the support bracket 274 (Fig. 5) and supports an adjustable stop screw 283 the function of which will be presently described. Directly underneath the bar 281 and in alignment therewith is a follower arm 284 which is pivoted on a stud 285 fastened to the inside of side frame 201. Arm 284 has a roller follower 286 which rides on the periphery of a cam 287 fixed on the cam shaft 225. The arm 284 is normally urged in a counterclockwise direction about stud 285 by a spring 288 fastened between said arm and a stud (not shown) which is attached to the side frame 201. Normally a predetermined space relationship is maintained between the stop screw 283 and the follower arm 284 by means of a spring 289 fastened between the studs 290 and 291. As best seen in Fig. 5, there is attached to the follower arm 284 a lift bail 292 which extends upward vertically, the upper end normally coming approximately flush with the ticket feed bed.

As the ticket is located in position $S_1$ the high portion on cam 287 will come into position to cam the follower arm 284 clockwise driving the lift bail 292 up through an opening 293 in the base plate 264 a slight distance sufficient to raise the pack of tickets remaining in the magazine, particularly at the ends which contain the registration hole F as shown in Fig. 4. As the follower arm pivots clockwise to raise the lift bail, it strikes the bottom of stop screw 283 causing the bar 281 to pivot clockwise a sufficient amount to pull the link 270 downward until the diamond stud 271 and pin 272 are clear of the ticket feed bed. The ticket in position $S_1$ is now free to be carried to the sensing station by the pin feed device.

Extending vertically upward through the opening 293 and parallel with the lift bail 292 is a gripper arm 294 having an elongated hole near the bottom which is mounted on a stud 295. The stud 295 is fixed to a support bracket 296 (Fig. 5) which is fastened to the inside of side frame 201. In the normal position, the gripper arm is maintained at the upper limit of its travel with the stud 295 seated in the bottom of the elongated slot by means of a spring 297 fastened between the end of the arm and a stud on bracket 296. The upper end of the gripper arm has a toothed nose portion 298 which is adapted to swing into engagement with the bottom few cards in the magazine each cycle, as will be presently described, to aid in positively seating the bottommost ticket onto the diamond-shaped stud 271 preparatory to feeding another ticket out of the magazine.

As shown in Fig. 5, the gripper arm normally bears against an ear 299 formed on the lift bail 292 due to the influence of spring 297 and in this position the toothed nose 298 is clear of the tickets in the magazine. Also, formed in the gripper arm is a notched portion 300 through which extends a cam arm 301. The cam arm 301 has a block portion 302 which is fastened to an auxiliary shaft 303. The auxiliary shaft 303 is journaled in a pair of support brackets 304, 305 which are fastened to the underside of the base plate 264. Also, fixed on the shaft 303 is a cam lever 306, which operates the pin feed device in a manner to be described, and a trip lever 307 which serves to operate the shaft 303 and cam lever 306.

Referring to Figs. 4 and 7, there is shown attached to the top of base plate 264 a supporting bushing 308 which rotatably supports a short shaft 309. Fastened to one end of the short shaft is a latch lever 310 having a hook nose portion which normally engages the end of trip lever 307 due to the influence of a spring 311 extending between an ear 312 formed on the latch lever and a bracket member 313.

Fastened on the other end of the short shaft 309 is a card lever 314 which normally is urged by spring 311 to extend down into a dip 315 formed in the top of the base plate 264. Although not shown, it should be pointed out that when the trip lever 307 is normally latched up as shown in Fig. 7, the shaft 303 is positioned so that a cam roller 316 rotatable on a follower arm 317 fixed to shaft 303 (Fig. 6) is raised slightly off from the periphery of a cam 318 fastened on the cam shaft 225. It will be understood that when a ticket is rotated out of the magazine to the position $S_1$ that the card lever and latch lever will be pivoted counterclockwise releasing the trip lever 307. A spring 319 fastened between the trip lever and a stud 320 will then cause the trip lever and shaft 303 to pivot clockwise a slight amount until the cam roller 316 strikes the periphery of cam 318. When latch lever 310 is unlatched it is maintained in a position for relatching at the end of an operating cycle by an ear 321, formed thereon, striking against the top of a stop screw 322 mounted on the base plate 264. At the end of the cycle cam 318 will cause the shaft 303 and trip lever 307 to return to their latched position.

The trip lever mechanism just described for the most part conditions the operation of the pin feed device; however, it also aids in the operation of the gripper arm 294. When shaft 303 was rotated clockwise the cam arm 301 was raised a slight amount to the position shown on Fig. 5, in which position it is ready to perform its function of camming the gripper arm. It will be remembered that the gripper arm normally bears against the ear 299 on the lift bail 292. When the lift bail is moved upward to lift the tickets in the magazine, the ear 299 clears the raised portion 323 and spring 297 causes the gripper arm to pivot counterclockwise slightly until the toothed nose 298 comes into engagement with the edges of the bottom few tickets being held up in the magazine by the lift bail. After the bottom ticket has been fed out of the magazine the lift bail 292 starts its downward travel at which time the ear 299 will engage the upper edge of the raised portion 323 and force the gripper arm to move straight down with the bail. As a result the toothed portion 298 will positively force the bottom few tickets downward to insure that the bottommost ticket will seat onto the diamond stud 271. After sufficient downward travel to accomplish the above, the upper inclined surface of notch 300 will strike the cam arm 301 causing the gripper arm to be pivoted clockwise about the stud 295. The toothed portion 298 will move out of engagement with the tickets and when the raised portion 323 clears the ear 299, spring 297 will cause the gripper arm to snap upward back to its normal position.

*Sliding block pin feed mechanism*

The sliding block pin feed mechanism which is utilized to convey the ticket from the position $S_1$ to the position $S_2$ beneath the sensing device is best shown in Figs. 9, 10 and 11. The mechanism is cam operated to reciprocate back and forth within two pairs of rail members 324 (Fig. 11) which are fastened to the underside of base plate 264. Each pair of rail members straddles an elongated opening 325 in the base plate through which the feed pins 326 operate.

Slidably mounted on the rail members and extending up within the elongated openings are a pair of slide block assemblies each one of which consists of two blocks 327, 328 and a spacer block 329 arranged as shown in Fig. 9. Both assemblies are bolted to the top of an operating member 330 having downwardly extending sides formed thereon for connection with the cam operating mechanism.

Fastened to the underside of the operating member 330 (Fig. 11) is a spacer 331 and then a plate 332 the front portion of which is formed with downwardly extending sides having horizontal flanges 333 at their ends. Mounted in between the operating member 330 and the plate 332 is a slide plate 334 having two downwardly extending ears 335 and a downwardly extending center flange portion 336. The slide plate contains four roller balls 337 which rest on the top of plate 332 permitting the slide plate to be moved horizontally between the operating member 330 and the plate 332.

The assembly of elements just described is provided to serve two purposes. It contains means for raising and lowering the two feed pins 326 into and out of the registration holes $F^1$ in the tickets and it functions as a reciprocating carriage unit for carrying the tickets from position $S_1$ to position $S_2$ on the base plate 264. The feed pins 326 (Fig. 1) slidably extend through the entire assembly and each pin has a collar 338 which bears against the underside of operating member 330 when the pins are in the raised position. Coil springs 339 retained between each pin collar 338 and the flanged ends 333 of plate 322 normally try to move the pins to their raised position. The pins are shown in their raised position in Figs. 9, 10 and 11. However, the pins are lowered at the end of each cycle, by a mechanism to be described, and are in their lowered position at the beginning of each cycle when a ticket is rotated to position $S_1$.

When in the lower position, the pins are retained there by the narrow portion of the irregular slots 340 (Fig. 10) through which they extend in the slide plate 334, said narrow portion of the slots bearing against the pin collars 338 under the influence of the springs 341 (Fig. 9) fastened between the plate 332 and the ears 335 of slide plate 334. It will be remembered that when a ticket is rotated out of the magazine to the position $S_1$ the card lever 314 is operated and shaft 303 is rotated slightly clockwise. The skid roll 267 stops the ticket in position $S_1$ with the registration holes $F^1$ in alignment with the lowered feed pins 326 and the subsequent rotation of shaft 303 permits the cam lever 306 (Fig. 9) to strike the flange 336 and move the slide plate 334 a sufficient amount to free the pins 326 from the narrow portion of the slots 340. The springs 339 will then drive the feed pins up through the registration holes in the ticket, the pins then assuming their raised position.

With a ticket placed on the raised feed pins in position $S_1$, the carriage unit is ready to be operated to convey the ticket to position $S_2$ beneath the sensing device. This is accomplished by the cam mechanism shown in Fig. 9, The mechanism comprises a cam 342 fixed on the main cam shaft 225 which coacts with a roller follower 343 mounted on a follower arm 344. The follower arm 344 is fixed at one end to an auxiliary shaft 345 journaled in the side frame 201 and is normally urged in a clockwise direction under the influence of a spring 346 fastened between a stud 347 on the arm and a stud 348 attached to the side frame.

The upper end of the follower arm 344 is fixed to a rod 349 which extends through a pair of connecting links 350 (see also Fig. 6). The connecting links are in turn connected to the sides of the operating member 330 and it can be seen that as cam 342 revolves counterclockwise the follower arm will pivot clockwise and pull the entire feed pin assembly to the right or toward the rear of the machine.

As shown in Fig. 5, the pin feed assembly has reached the limit of its rearward travel and is in the middle of a short dwell period caused by the small bump on the periphery of cam 342. It will be noted that in this position the lower portion of the feed pins are positioned within the forked members 351 fastened to a pair of arms 352, 353 as shown in Fig. 6. The arms 352, 353 are fixed on an auxiliary shaft 354 journaled between the side frame 201 and a support bracket 355 (Figs. 5 and 9) fastened to the underside of the base plate 264. The lower end of arm 352 supports a roller follower 356 which rides on the periphery of a cam 357, fastened on the cam shaft 225, under the influence of a spring 358 fastened between a stud 359 on the arm and a stud 360 on the machine frame.

When the pin feed carriage unit is in its short dwell period the cam 357 will be in position to cause the arm 252 and shaft 354 to pivot counterclockwise. As a result the forked members 351 will strike the lower collars 361 on the feed pins and pull the feed pins down out of the registration holes in the ticket. As was previously mentioned the pins are retained in their lower position by the narrow portion of the irregular slots 340 in the slide plate 334 bearing against the pin collars 338 under the influence of springs 341.

As the small bump on cam 342 moves past the roller follower 343 the cam begins to force the follower arm 344 counterclockwise and the carriage unit with the feed pins retained in their lower position starts to slide back to its normal position near the front of the machine preparatory to receiving the next ticket. Also, cam 357 moves into position to allow the arm 352 and shaft 354 to rotate clockwise thereby moving the forked members 351 back up to their original position in readiness to again intercept the feed pins 326 on the next feed cycle.

When the carriage unit nears the limit of its forward travel cam 318 becomes effective to force the follower arm 317 and cam lever 306 counterclockwise. The cam lever 306 is moved back a sufficient amount to be relatched by the latch lever 310, in which position it is clear of the forward travel of the slide plate 332 and flange 333 and cannot prematurely effect the release of the feed pins.

Referring to Fig. 9, it will be noted that there is a microswitch 362 mounted on a bracket 363 which is fastened to the frame member 202. The microswitch is normally held closed by the bottom collar 361 of the feed pin when the carriage unit is at its forward limit of travel. The switch is opened by the release of the feed pins and remains open during the travel of the carriage unit, said switch serving to disable skid roll rotation until it is time to feed another ticket stub out of the magazine.

When in the position $S_2$, the ticket rests partially beneath a pressure pad 364 (Fig. 4) and an upper guide plate 365. The pressure pad 364 is a part of the sensing device. The guide plate 365 is positioned in place by a pair of screw studs 366 arranged on the top surface of base plate 264 and a thumb screw 367 which screws into the side of the frame member 201. The thumb screw 367 is provided so that the guide plate may be conveniently removed if desired.

Referring to Figs. 1 and 4, the arrival of a ticket into posititon $S_2$ cams a sensing card lever SCL, which is pivoted in a bracket 368 fastened to the top of base plate 264, clockwise to close a pair of contacts TSC fastened to the underside of the base plate. The closure of contacts TSC controls the readout of the sensed information. Referring to Figs. 1 and 2, there is shown a pair of contacts $T_1$ mounted on a bracket 369 which is fastened to the support plate 203. The contacts $T_1$ are operated by cam 370 fastened on the shaft 210.

*Eject feed mechanism*

As was previously mentioned, after sensing, the ticket is fed from position $S_2$ to the position $S_3$ in the eject stacker. The mechanism for initiating the eject feed comprises a face cam 372 (Fig. 6) integral with the gear 224 on shaft 225. Cooperating with the face cam is a follower arm 373 pivoted on a bracket 374 which is fastened to the frame member 202. A roller follower 375 rotatably mounted on the end of the follower arm rides against the face cam under the influence of a spring 376 fastened between a stud 377 on the follower arm and a stud (not shown) on frame member 202.

The upper end of the follower arm has a bent flange portion 378 which projects slightly up through a slot in a pusher plate 379. The follower arm and flange extend through an opening in the base plate 264 with the bottom surface of the pusher plate coming flush with the top surface of the base plate. A guide plate 380 (Fig. 4) fastened to the base plate extends around the pusher plate and is provided with an opening 381 to allow for the movement of the follower arm 373 and flange 378. When in the position $S_2$ the ticket is in alignment with the pusher plate and it can be seen that when the roller follower 375 enters the depression in the face cam near the end of the cycle the follower arm will pivot clockwise causing the raised leading edges 382 of the pusher plate to engage the ticket and push it out from position $S_2$ and toward position $S_3$.

The pusher plate kicks the ticket in between a pair of eject feed rollers 383 and 384 (Figs. 4 and 5). The top feed roller 383 is rotatably mounted in a U-shaped block 385 which is pivoted on a stud 386 fastened to a support block 387. A spacer 388 separates the block 385 from the support block 387. A spring 389 extending between the blocks 385 and 387 urges block 385 to pivot about stud 386 to maintain the feed roller 383 against the feed roller 384.

The feed roller 384 is fixed on a short shaft 390 (Figs. 5 and 6) which is rotatably in a bearing block 391 fastened to the underside of the base plate 264. The feed roller 384 is driven by means of a pulley 392 fixed on the end of shaft 390, a pulley 393 fixed on the main cam shaft 225 and a belt 394 which connects said two pulleys. The belt 394 is guided from the pulley 393 onto pulley 392 by a small pulley 395 rotatably mounted on a bracket 396 (Fig. 5) which is fastened to the inside of frame member 202. The revolving feed rollers 383, 384 accept the ticket from the pusher plate and feed it onto a stacker plate 397 (Figs. 1 and 4). The ticket will be stopped by a vertical ear 398 formed on a guide bracket 399 fastened to the frame member 201. The guide bracket supports a vertical rod 400 upon which is slidably mounted a bushing 401 fastened to the top surface of the stacker plate 397. An ear 402 formed in the stacker plate fits loosely into a vertical slot 403 cut in the frame member 201 and the stacker plate is free to move up and down along the slot and the vertical rod. The stacker plate is biased upward by a spring 404 fastened between the stacker plate and a bracket arm 405 mounted on top of the sensing unit. As the tickets accumulate on the stacker plate, the plate gradually descends until it reaches the bottom of its travel where it closes a microswitch 406 to signal that the stacker is filled to capacity. A guide plate 407 is provided along the left side of the stacker mechanism and is fastened to the frame member 201.

While there have been shown and described and pointed out the fundamental novel features of the invention as applied to a preferred embodiment, it will be understood that various omissions and substitutions and changes in the form and details of the device illustrated and its operation may be made by those skilled in the art, without departing from the spirit of the invention. It is the intention, therefore, to be limited only as indicated by the scope of the following claims.

What is claimed is:

1. In a ticket feeding device, a magazine for holding a stack of tickets; means for engaging the surface of the bottom ticket of the stack to rotate said ticket through an arc to expose a portion thereof; means to restrain the second ticket from the bottom of the stack against rotation with the bottom ticket; and means engageable with said exposed portion of the bottom ticket to withdraw the same completely from the stack.

2. In a device for feeding tickets, each ticket having a polygonal guide hole and the guide holes of all tickets being aligned when the tickets are stacked; a magazine for holding a stack of the tickets and including a rod for insertion in the guide holes of the tickets, the rod having a polygonal cross section conforming to the configuration of the guide holes, adapted to restrain the tickets against rotation about the rod; a magazine bed and means to mount the magazine thereon in an inverted position such that the bottom ticket, and only the bottom ticket of the stack, is below the bottom end of said rod; pivot means opposed to and aligned with the bottom end of the rod, adapted to guide the bottom ticket of the stack for rotation about said pivot means; and means to engage the surface of the bottom ticket of the stack to rotate said ticket through an arc centered at said pivot, to expose a portion thereof.

3. A device as in claim 2 further characterized by means operable to raise the stack of tickets on said rod after the bottom ticket has been rotated, actuating means effective after rotation of said bottom ticket for operating said last mentioned means, means for gripping the raised stack of tickets, means controlled by said actuating means for operating said gripping means, means for moving said pivot means out of the hole in the bottom ticket, and means under control of said actuating means for operating said pivot moving means.

4. In a device for feeding tickets, each ticket having a polygonal guide hole and the guide hole of all tickets being aligned when the tickets are stacked; a magazine for holding a stack of the tickets and including a rod for insertion in the guide holes of the tickets, the rod having a polygonal cross section conforming to the configuration of the guide holes, adapted to restrain the tickets against rotation about the rod; a magazine bed and means to mount the magazine thereon in an inverted position such that the bottom ticket, and only the bottom ticket of the stack, is below the bottom end of said rod; a spindle opposed to and aligned with the bottom end of the rod, adapted to guide the bottom ticket of the stack for rotation about said spindle; and a skid roll operable against the surface of the bottom ticket of the stack to rotate said ticket through an arc centered at said spindle, to expose a portion thereof.

5. In a device for feeding tickets, a magazine for holding a stack of tickets, means for rotating the bottom ticket of the stack through an arc which is in the plane of said ticket to expose a portion thereof, means to restrain the second ticket from the bottom of the stack against rotation with the bottom ticket, and means operable to engage in feed holes in the exposed portion of the bottom ticket and continue the feed of said bottom ticket in a straight line direction.

6. In a device for feeding tickets, a magazine for holding a stack of tickets, means for rotating the bottom ticket of the stack through an arc which is in the plane of said ticket to expose a portion thereof, means to restrain the second ticket from the bottom of the stack against rotation with the bottom ticket, means operable for engaging feed holes in the exposed portion of said bottom ticket, means controlled by the rotation of said bottom ticket for operating said engaging means, and means for feeding said engaging means and bottom ticket in a straight line direction.

7. In a device for feeding tickets, a magazine for holding a stack of tickets, means for rotating the bottom ticket of the stack through an arc which is in the plane of said ticket to expose a portion thereof, means to restrain the second ticket from the bottom of the stack against rotation with the bottom ticket, means operable for engaging feed holes in the exposed portion of said bottom ticket, means controlled by the rotation of said bottom ticket for operating said engaging means, means for feeding said engaging means and bottom ticket in a straight line direction, and means controlled by said engaging means for disabling said rotating means.

References Cited in the file of this patent

UNITED STATES PATENTS

| | | |
|---|---|---|
| 282,014 | Stuart | July 24, 1883 |
| 1,210,443 | Elliott | Jan. 2, 1917 |
| 1,627,905 | Jensen | May 10, 1927 |
| 2,275,396 | Johnson | Mar. 3, 1942 |
| 2,352,088 | Evans | June 20, 1944 |
| 2,567,223 | Maher | Sept. 11, 1951 |
| 2,590,222 | Van Veen | Mar. 25, 1952 |
| 2,623,592 | Knutsen | Dec. 30, 1952 |
| 2,647,581 | Gardinor et al. | Aug. 4, 1953 |